July 26, 1955 C. O. WEISENBACH 2,713,869
FLUID PRESSURE REGULATOR
Filed Oct. 7, 1949 2 Sheets-Sheet 1

INVENTOR.
CHARLES O. WEISENBACH
BY
ATTORNEY

July 26, 1955

C. O. WEISENBACH 2,713,869

FLUID PRESSURE REGULATOR

Filed Oct. 7, 1949

INVENTOR.
CHARLES O. WEISENBACH
BY
*K. G. Doub*

ATTORNEY ed States Patent Office 2,713,869
Patented July 26, 1955

2,713,869
FLUID PRESSURE REGULATOR

Charles O. Weisenbach, South Bend, Ind., assignor to Bendix Aviation Corporation, South Bend, Ind., a corporation of Delaware Application October 7, 1949, Serial No. 120,211

15 Claims. (Cl. 137—58)

This invention relates to a fluid pressure regulator; it is primarily concerned with the regulation of hydraulic flow to a servo valve or analogous device.

An object of the invention is to provide a fluid pressure regulator which will be unusually sensitive in operation, yet simple in design and construction.

Another object is to provide a fluid pressure regulator which can be used with extremely high pressures and yet be capable of producing a pressure take-off varying from a substantial vacuum to a high positive pressure, with any given input pressure.

Another object of the invention is to provide an improved variable pressure hydraulic servo valve particularly adapted for speed governor controls, for example, a governor valve for regulating the flow of fuel to an engine to maintain a selected engine speed.

The foregoing and other objects and advantages will become apparent in view of the following description taken in conjunction with the drawings, wherein.

Figure 1:
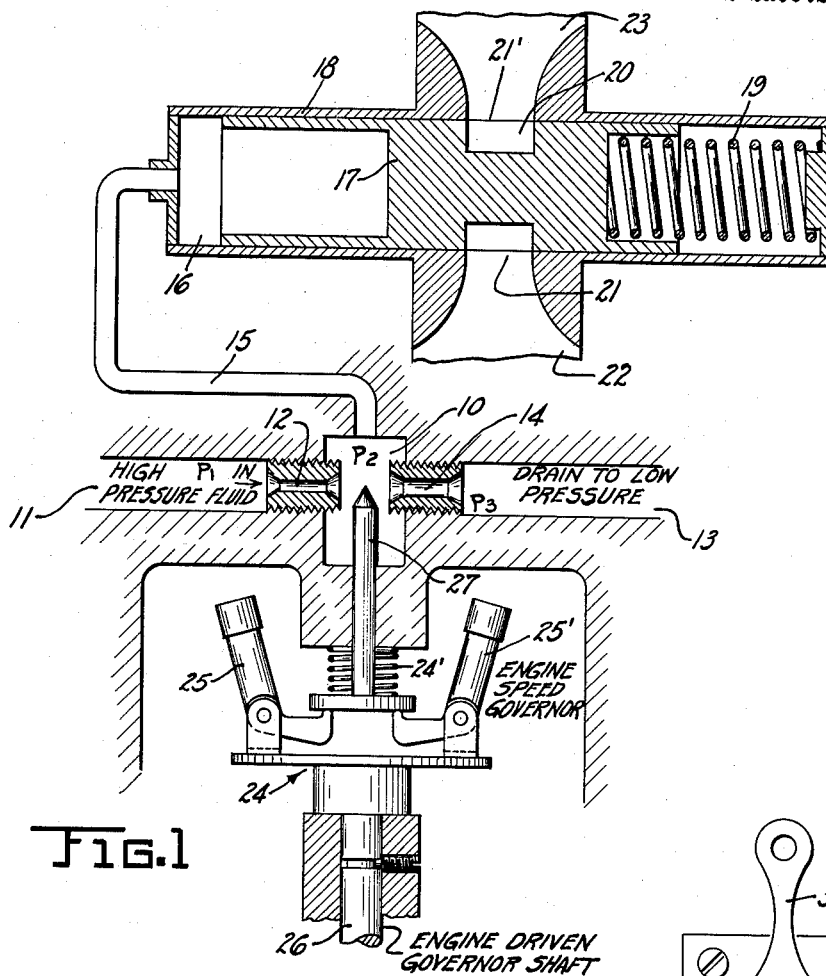
Figure 1 is a sectional schematic view of a governor type hydraulic servo system embodying the present invention.

Referring to the drawings in detail, and first to Figure 1, the servo valve comprises an intermediate chamber 10, to which hydraulic fluid is directed under pressure through a conduit 11 having a restricted orifice 12 therein. Drain fluid is taken from chamber 10 by way of conduit 13 having an orifice 14 therein, which in the example shown is larger than, and in substantial alignment with, the orifice 12.

Fluid from the chamber 10 flows by way of passage 15 to chamber 16 and acts on a throttle valve 17, slidingly mounted in a cylindrical casing 18 and being normally urged toward a return position by a calibrated spring 19. The throttle valve 17 is provided with an annular recess 20, and the casing or housing 18 is formed with an inlet port 21 and a discharge port 21', which ports constitute metering restrictions variable in area through movement of the throttle valve 17. Fuel at some suitable regulated pressure flows to the metering restriction 21 by way of a conduit 22, and metered fuel from restriction 21' flows by way of conduit 23 to a suitable point of discharge, which may be the fuel manifold and pressure nozzles constituting part of the burner system of a gas turbine engine, not shown.

A centrifugal governor is indicated at 24; it is provided with a governor spring 24' and a pair of centrifugal weights 25 and 25', and has its body portion secured on a rotatable drive shaft 26. The body portion carries a deflector member or valve 27 which projects into the chamber 10 and is adapted to move varying distances between the restricted orifices 12 and 14. To simplify the illustration in Figure 1, the governor is shown as being of the overspeed type. Obviously, if desired, a manual control could be applied to variably tension the governor spring 24' and thus render the device of Figure 1 capable of being used as an all-speed governor.

Operation

If the two orifices 12 and 14 are arranged in alignment as in the specific example illustrated in Figure 1, an ejector or pumping action will be exerted on the fluid in chamber 10 when a flow is established through the conduits 11 and 13. This is true, since if we assume the stream is uninterrupted in flowing through orifice 14, it will carry with it a certain quantity of fluid from the chamber 10, which tends to reduce the $P_2$ pressure therein. If the stream is deflected or the orifices are arranged out of alignment, there will be a tendency to build up pressure in chamber 10 in proportion to such deflection or misalignment.

The action of the valve 27 combines the foregoing principles since it in effect constitutes a variable deflector. At some speed below a predetermined maximum, the springs 19 and 24' would be in balance with pressure $P_2$ and the centrifugal weight force respectively, and the deflector needle or valve 27 would be in the position shown, at which time there is a minimum of deflection of the hydraulic fluid into the chamber 10. Should the engine speed increase beyond such maximum value, the valve 27 would be projected further into the chamber 10 between the orifices 12 and 14, causing an increasingly greater amount of fluid to be deflected into the chambers 10 and 16 and proportionally build up the pressure therein. The pressure increase in chamber 16, tends to move the throttle or metering valve to the right, decreasing the area of the metering restrictions 21 and 21' and correspondingly decreasing the rate of fuel feed and engine speed until springs 19 and 24' are again in balance with pressure $P_2$ and the centrifugal weight force respectively. Obviously, if desired, the design may be such that the valve 27 may be completely withdrawn from the stream, in which instance a pumping or ejector action will take place in chamber 10 which will reduce the pressure to less than gauge pressure.

Experience has shown that the improved servo valve is unusually sensitive in its controlling action. Obviously a change in shape of the deflector valve 27 will vary the characteristics of the effective pressure $P_2$. Thus, by using a relatively blunt valve 27, the pressure curve will be rendered sharp and extremely sensitive, and by using a relatively long and tapered valve, the slant of the pressure curve may be correspondingly reduced. A relatively wide range of pressures $P_2$ may be obtained, giving a correspondingly wide range of controlling action. The device is exceptionally useful in converting a very small mechanical motion into a differential hydraulic pressure.

Figures 2 and 3

Figure 3:
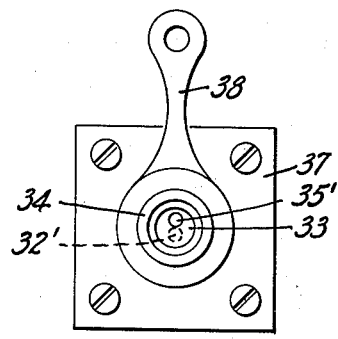
Figures 2 and 3 are views in longitudinal section and end elevation, respectively, of a modified form of servo valve with respect to that shown in Figure 1.
Figure 2:
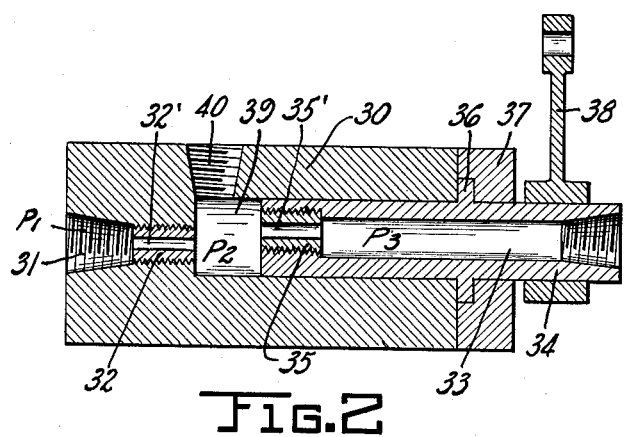

In Figures 2 and 3, the servo valve operates to vary the effective pressure by moving the low pressure or drain ($P_3$) orifice out of alignment with the input pressure ($P_1$) orifice. The valve body or casing is indicated at 30; it is tapped at its left end to provide a fluid inlet 31 having therein a threaded fitting 32 formed with a restricted orifice 32'. A drain conduit 33 is provided in a rotatable deflector member 34, the inlet or left-hand end of said conduit having therein a threaded fitting 35 formed with a calibrated drain orifice 35'. The hollow member 34 has a retaining flange 36, rotatable in a bearing recess formed in an end cap 37. A lever 38 is shown as a means for rotating the member 34. The space indicated at 39 constitutes a variable pressure chamber similar to the chamber 10 of Figure 1, the valve body 30 being tapped at 40 to accommodate a connection for P₂ pressure.

It will be noted that the orifice fitting or plug 35 is located eccentrically of the rotatable member 34. The purpose of this is to cause the drain orifice 35' to move further and further out of alignment with the orifice 32' as the lever 38 is rotated through 360 degrees. At minimum servo pressure (P₂) the orifice 35' will be in substantial alignment with the orifice 32', but as the member 34 rotates from this low or zero pressure position, the deflecting action increases and the P₂ pressure increases.

Figure 4

Figure 4:
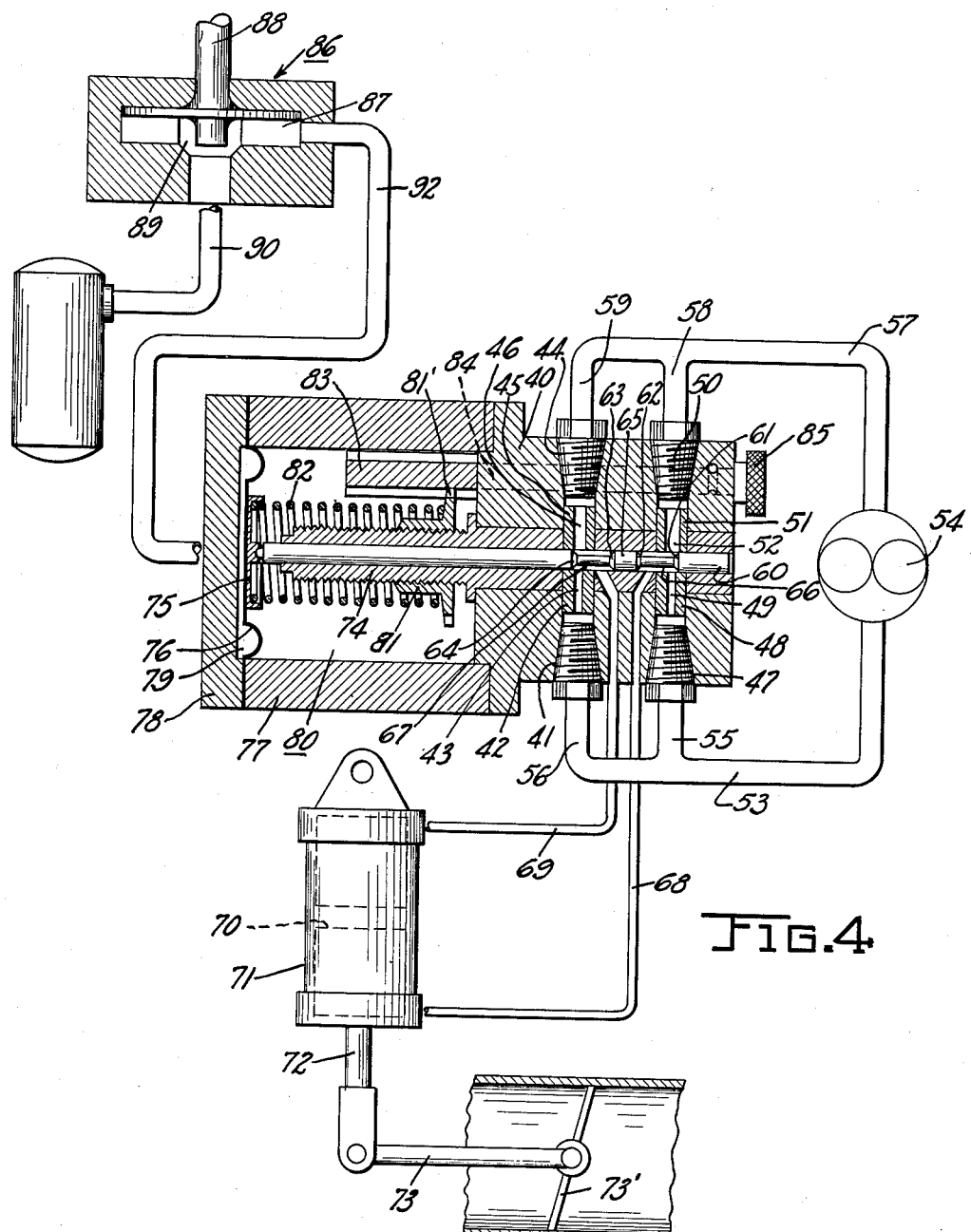
Figure 4 is a view in sectional schematic of another modified form of servo valve and also showing it adapted for use with a hydraulic governor to control the speed of an engine.

In Figure 4 the servo valve operates on the same general principle as in Figures 1 and 2 except in this instance it has two sets of orifices adapted to impart reciprocating motion to a piston type servomotor. The valve body is indicated at 40; it is tapped at 41 for insertion of an orifice member or plug 42 having a restricted input orifice 43; at 44 for insertion of an orifice member or plug 45 having a drain orifice 46 which is in series with and larger than the orifice 43; at 47 for insertion of an orifice member or plug 48 having a restricted input orifice 49 which may be similar to orifice 43; and at 50 for insertion of orifice member or plug 51 having a drain orifice 52 therein which is in series with orifice 49 and may be similar to orifice 46. The hydraulic circuit comprises input or P₁ pressure passage 53 leading from the delivery side of a pump 54, which may be driven in any suitable manner, as for instance from an engine with which the servo system may be operatively associated. Branch passages 55 and 56 conduct the hydraulic fluid from passage 53 to the input orifices 43 and 49. A return or drain conduit 57 having branch passages 58 and 59 conduct the low pressure fluid to the input side of pump 54.

A deflector member or valve is indicated at 60; it is provided with contoured surfaces or portions 61, 62, 63 and 64 and an intermediate land 65. On opposite sides of this land the valve is recessed to provide pressure chambers 66 and 67, which correspond to the chamber 10 of Figure 1 or 39 of Figure 2. Conduits 68 and 69 communicate operating or P₂ pressure from the respective chambers 66 and 67 to the opposite sides of a servo piston 70 mounted to reciprocate in a cylinder 71. The piston 70 is connected by rod 72 and lever 73 to the part to be controlled, which in Figure 4 is the air throttle 73' of a reciprocating internal combustion engine.

The valve 60 is slidingly mounted in a bearing and guide member 74 and at its one end is operatively connected through a diaphragm plate or disc 75 to a diaphragm 76, the peripheral edge of which is clamped between a cylindrical wall 77 and a cap 78. The diaphragm 76 forms a movable wall between chambers 79 and 80.

The one extremity of the member 74 is threaded to receive a nut 81 having a gear 81' formed on a flanged portion thereof. A coil spring 82 encircles the member 74 between the flange of the nut 81 and the diaphragm plate 75. The tension of this spring is adjustable by means of an elongated gear or pinion 83, which is secured on the free end of a shaft 84, rotatably mounted in the valve body 40 and at its opposite end carrying a knurled adjusting nut 85, which serves as a throttle control when the system is used with an engine as in the present instance.

A centrifugal pump is generally indicated at 86; it has an impeller 87 carried by a shaft 88 which may be engine driven, said impeller being mounted in a chamber 89 having its input communicating by means of conduit 90 with a suitable source of hydraulic fluid, shown as a reservoir 91, and its output communicating with diaphragm chamber 79 by means of conduit 92.

When the impeller 87 is rotated, it produces a pressure in chamber 79, and if the impeller is driven by an engine, it will generate a pressure proportional to the square of engine speed. If the throttle control nut 85 is rotated in a direction to increase the force exerted by spring 82 on diaphragm 76 or the differential across the diaphragm, valve 60 will move to the left, whereupon the pressure in chamber 66 and conduit 68 will increase and the pressure in chamber 67 and conduit 69 will decrease, causing piston 70 to move upwardly and open throttle valve 73. This will produce an increase in engine speed and a corersponding increase in the pressure generated by the centrifugal pump 86, until the differential across diaphragm 76 becomes zero, whereupon the governor circuit is in equilibrium and the engine speed is held substantially constant. If the nut 85 is turned in a direction to reduce the tension of spring 82, the foregoing operation is reversed, the engine speed being reduced until the pressure generated by centrifugal pump 86 balances the force exerted by spring 82.

Although only three embodiments of the invention have been illustrated and described, various changes in the form and relative arrangement of the parts may be made to suit requirements.

I claim:

1. In a hydraulic pressure regulator for control systems for engines, means defining a control pressure chamber, an inlet flow passage for conducting hydraulic fluid to said chamber having an inlet orifice therein, a drain passage for continuously conducting fluid from said chamber having an outlet orifice therein of greater area than said inlet orifice, said inlet orifice being directed toward said outlet orifice so that a portion of a fluid stream or jet is directed to flow directly from said inlet orifice to said outlet orifice, and a member responsive to a condition of engine operation and movable varying distances into the stream flowing across the chamber between said orifices for varying the control pressure in said chamber in a predetermined manner.

2. A pressure regulator as claimed in claim 1 wherein said orifices are arranged in substantial coaxial alignment.

3. In a fluid pressure regulator, a pair of flow orifices arranged in series and in spaced relation, a pressure chamber between said orifices, and means for moving one of said orifices varying distances into and out of alignment with respect to the other orifice.

4. A fluid pressure regulator as claimed in claim 3 wherein one of said orifices is formed in a member rotatable about an axis out of axial alignment with respect to the other orifice.

5. In a hydraulic servo system, a plurality of pairs of flow orifices with the input orifice of each pair arranged in series flow relationship with the drain orifice of each pair, means defining a pressure chamber between the orifices of each pair, means for conducting a hydraulic fluid under pressure to said input orifices and means for conducting low pressure or drain fluid from said drain orifices, and a valve member movable in the space between said orifices and having active portions adapted to vary the take-off rate of said drain orifices.

6. A hydraulic servo system as claimed in claim 5 wherein said active portions of said valve member are contoured to deflect varying quantities of fluid into said pressure chambers.

7. In a pressure regulator for engine control systems, means defining a control pressure chamber, an input orifice for conducting fluid to said chamber, a receiver orifice for continuously conducting fluid from said chamber, said input orifice being directed toward said receiver orifice so that a portion of a fluid stream or jet is directed to flow directly from said input orifice to said receiver orifice, and a condition responsive member movable varying distances into the stream flowing across the chamber between said orifices for varying the control pressure in said chamber.

8. In a fluid pressure regulator, an input orifice, a drain orifice in series with and in spaced relation to said input orifice, said drain orifice having a greater area than said input orifice, means defining a variable pressure chamber between said orifices, and means for axially misaligning by varying amounts one orifice with respect to the other orifice.

9. In a fluid pressure regulator for hydraulic systems, a pair of flow orifices arranged in series and in spaced relation and adapted for flow of liquid under pressure from one orifice to the other, and means for moving one of said orifices varying distances out of alignment with respect to the other orifice.

10. In a hydraulic pressure regulator for control systems for engines, means defining a control pressure chamber, means defining a conduit terminating in an input orifice for continuously conducting hydraulic fluid under pressure to said chamber, means defining a discharge orifice for draining fluid from said chamber, said input orifice being directed toward said discharge orifice so that a portion of a fluid stream or jet is directed to flow directly from said input orifice to said discharge orifice, and means for varying the fluid take off rate of said discharge orifice at a given input rate to said input orifice to thereby vary the effective pressure in said chamber, said last mentioned means including an engine condition responsive deflector member movable varying distances into the stream of hydraulic fluid flowing between said orifices and across said chamber.

11. A variable pressure servo system for controlling an operating condition in an engine comprising means providing a liquid inlet orifice, means providing a liquid outlet orifice in spaced relation thereto and in substantial axial alignment therewith, said inlet and outlet orifices constituting a passage for the continuous flow of liquid under pressure, means defining a variable pressure chamber between said inlet and outlet orifices across which passes the liquid stream when liquid is flowing through said passage, and a member responsive to the engine condition to be controlled and movable varying distances into said stream for variably deflecting the stream into the variable pressure chamber.

12. In a hydraulic pressure regulator for control systems for engines, means defining a variable pressure chamber, means defining a restricted flow orifice through which hydraulic fluid under pressure is conducted to said chamber, means defining a flow orifice for continuously draining said fluid from said chamber, the effective pressure of the fluid in said chamber being at a minimum value when said orifices are in alignment and the stream is unimpeded in its passage across the chamber, and means responsive to variations in the speed of the engine for variably deflecting said stream relatively to its receipt by said last mentioned orifice as a function of engine speed.

13. A hydraulic pressure regulator for control systems for engines comprising means defining a hydraulic fluid pressure chamber having an inlet orifice adapted to be connected to a source of hydraulic fluid under pressure and an outlet orifice in spaced relation to said inlet orifice for continuously conducting fluid from said chamber, a drain passage connected to said outlet orifice, and fluid stream interrupter means responsive to variations in the speed of the engine for deflecting a quantity of fluid from the stream which passes through said chamber to said drain passage which varies as a function of engine speed.

14. In a speed governor control having a pressure responsive valve for controlling the flow of motive fluid to an engine, a fluid pressure chamber operatively connected to the valve, a restricted inlet flow passage for conducting fluid under pressure to said chamber, an outlet flow passage for conducting fluid from said chamber, a stream deflector member adapted to be moved into the stream of fluid flowing across said chamber between said passages when the governor is in operation, and engine speed sensing means operatively connected to said deflector member and adapted to move said member varying amounts into the stream of fluid flowing across said chamber as a function of engine speed for controlling the pressure of the fluid in said chamber.

15. In an engine speed governor control having a pressure responsive valve for controlling the flow of motive fluid to the engine, a pair of flow orifices arranged in series and in spaced relation to each other, a variable fluid pressure chamber between said orifices operatively connected to said valve means, a deflector member, engine speed sensing means operatively connected to said member and adapted to move said member into the stream of fluid flowing across said chamber when the governor is in operation, whereby the fluid pressure in said chamber varies as a function of engine speed for controlling operation of the valve.

References Cited in the file of this patent

UNITED STATES PATENTS

| | | |
|---|---|---|
| 138,199 | Rue | Apr. 22, 1873 |
| 162,852 | Patton | May 4, 1875 |
| 542,702 | Christensen | July 16, 1895 |
| 806,901 | Mendenhall | Dec. 12, 1905 |
| 1,111,776 | Trotter | Sept. 29, 1914 |
| 1,112,066 | Hollis | Sept. 29, 1914 |
| 1,529,178 | Greenwood | Mar. 10, 1925 |
| 1,807,173 | Ray | May 26, 1931 |
| 1,930,284 | Reedy | Oct. 10, 1933 |
| 2,117,800 | Harrison et al. | May 17, 1938 |
| 2,223,712 | Ziebolz | Dec. 3, 1940 |
| 2,265,114 | Hartley | Dec. 2, 1941 |
| 2,405,979 | Rosenberger | Aug. 20, 1946 |
| 2,417,994 | Sheets | Mar. 25, 1947 |
| 2,539,131 | Gundersen | Jan. 21, 1951 |

FOREIGN PATENTS

| | | |
|---|---|---|
| 673,159 | France | Oct. 7, 1929 |